Oct. 22, 1935.  N. M. FAULDS  2,017,960
FRUIT JUICE EXTRACTOR
Filed Nov. 13, 1933   2 Sheets-Sheet 1
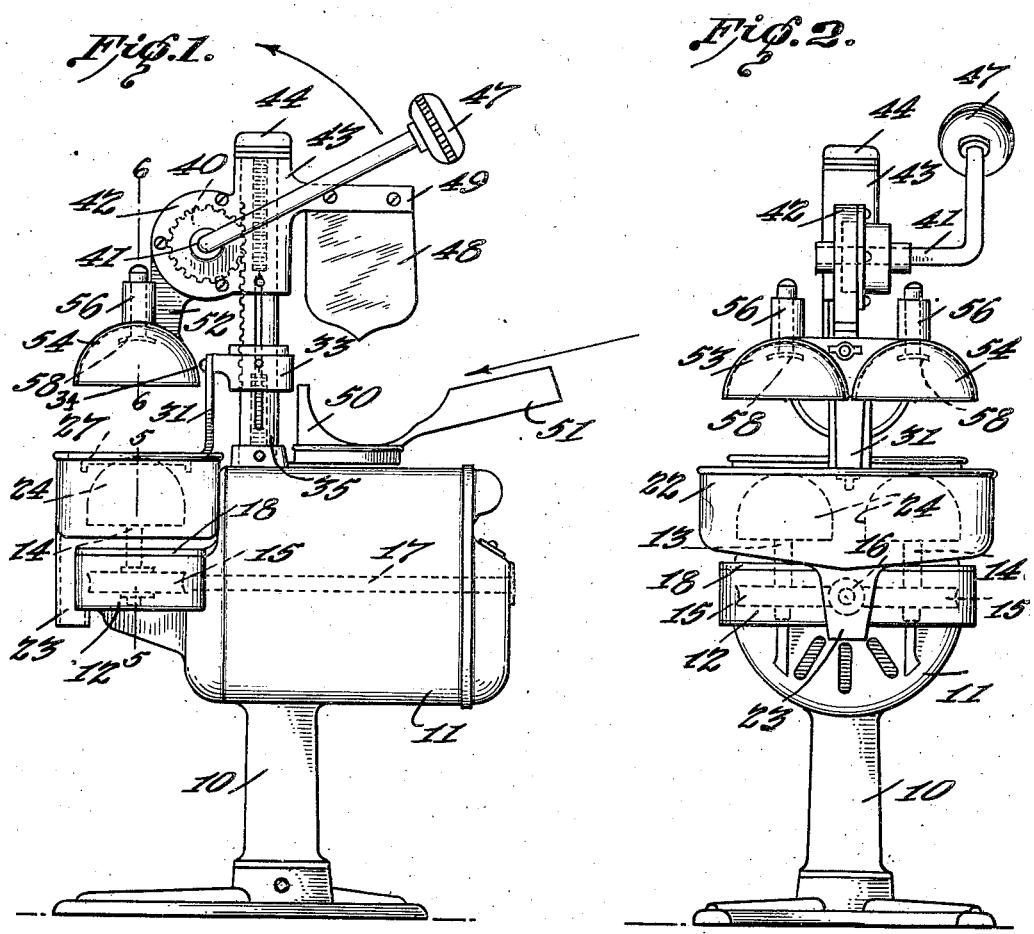
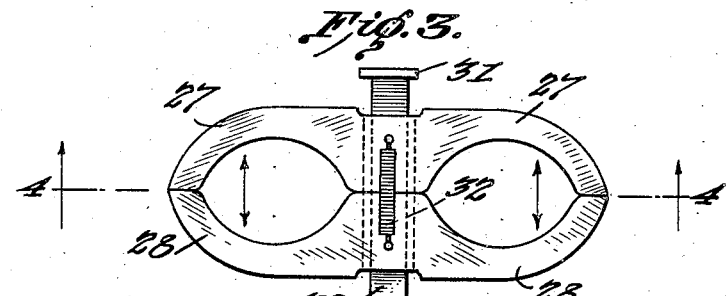

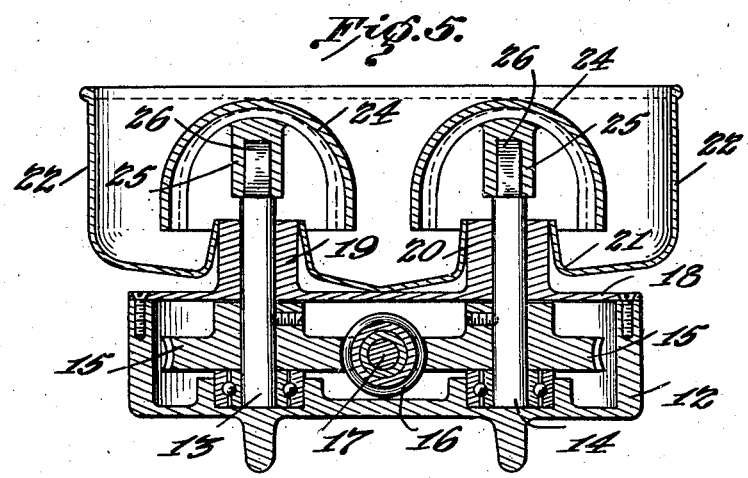
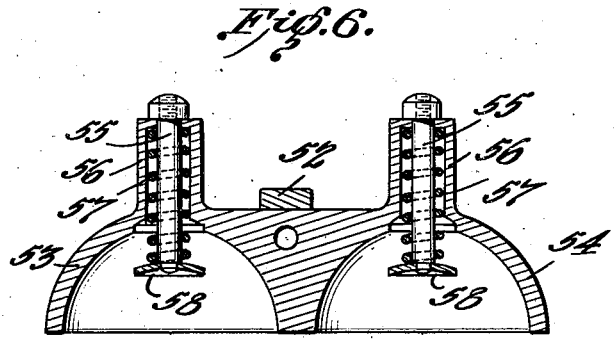
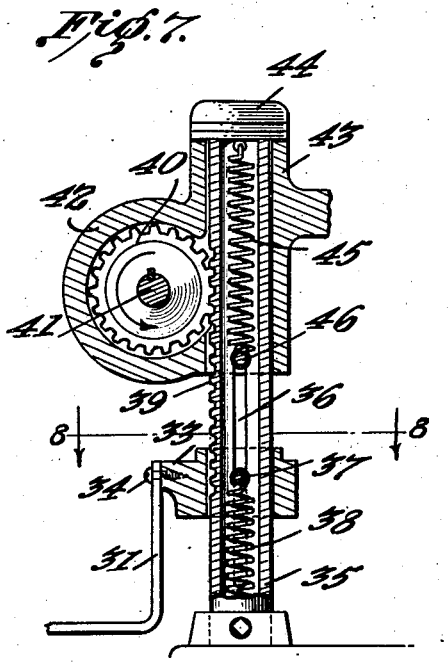
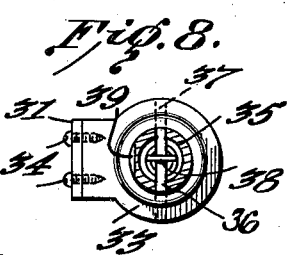
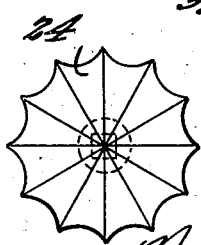

Patented Oct. 22, 1935

2,017,960

UNITED STATES PATENT OFFICE 2,017,960

FRUIT JUICE EXTRACTOR

Norval M. Faulds, Clearwater, Fla.

Application November 13, 1933, Serial No. 697,837

4 Claims. (Cl. 146—3)

This invention relates to fruit juice extractors, and more particularly the invention relates to orange or citrous fruit juice extractors.

It is an object of this invention to provide a fruit juice extractor in which reamers are rotated in associated relation with means for forcing portions of the fruit into engagement therewith so that the reamers may remove the juice from the fruit, and the invention in its present embodiment is more particularly intended for domestic use, as distinguished from those machines for extracting juices that are used commercially.

It is a further object of this invention to provide novel means for cutting the fruit in half and simultaneously therewith presenting previously sectioned fruit to the reamers.

It is a still further object of the invention to provide novel means whereby the skin of the fruit after the juice has been removed therefrom is disengaged from the reamers and positioned conveniently for disposition thereof by hand.

It is furthermore an object of the invention to provide novel means, preferably hand operated, whereby the knife or cutter and the movement of the fruit with relation to the reamers is accomplished simultaneously, novel means being provided for restoring the parts to initial position for a repetition of the operation.

It is a still further object of the invention to provide a domestic fruit juice extractor which is strong and durable and comparatively inexpensive.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in side elevation of a juice extractor showing one embodiment of the invention;

Figure 2 illustrates a front elevation thereof;

Figure 3 illustrates a plan view of the shutters for supporting and moving the fruit;

Figure 4 illustrates a sectional view on the line 4—4 of Fig. 3;

Figure 5 illustrates a sectional view on the line 5—5 of Fig. 1;

Figure 6 illustrates a sectional view on the line 6—6 of Fig. 1;

Figure 7 illustrates a sectional view of the manually operated portion of the machine;

Figure 8 illustrates a sectional view of the standard and parts associated with it; and Figure 9 illustrates a plan view of one of the reamers.

In these drawings 10 denotes a frame or standard which supports a motor 11, which is preferably an electric motor, and, since such motors are well known, the details of construction thereof are omitted and the conductors therefor are also omitted. The motor casing has an extension 12, preferably integral therewith, which may be termed a "gear casing", in which shafts 13 and 14 are journaled, each of which is provided with a worm wheel such as 15 that is engaged by a worm 16 on a shaft 17, which shaft is an extension of the commutator shaft of the motor.

A cover plate 18 of the gear casing has bearings 19 and 20 for the respective shafts 13 and 14, and the said bearings fit into apertures in the bottom 21 of a cup 22 which is intended to receive the fruit juice, it being shown that the said cup has a spout 23 for the discharge of the juices, and the spout may of course empty into any suitable receptacle or conduit for the disposal of the said juices.

Each shaft has a reamer such as 24 on its upper end and preferably the under surface of each reamer has an apertured boss 25 which fits on the upper end 26 of a shaft, the said shaft being preferably angular in cross section and the aperture of the boss corresponding in shape so that the reamers may be applied to or removed from the shaft in order that access to the interior of the cup may be had and that the cup may be removed.

It is obvious that when the motor is in operation, the reamers will be continuously rotated so that when the fruit is pressed into engagement with them, the juice and pulp will be extracted.

As a means for placing the fruit in position to be acted on by the reamers, preferably the half portions of the fruit may be placed on shutters 27 and 28, each of which has a central portion 29 apertured to receive a horizontally disposed portion 30 of a bracket 31, and the said shutters are slidable on the said portion 30 so that they may move toward and away from each other. The shutters are under the influence of a spring 32 which tends to draw them together, as will presently appear.

The bracket 31 is attached to a sleeve 33 by fastenings 34 such as screws or the like, and the sleeve is slidable on a hollow post 35 which is, in the present embodiment of the invention, supported by the motor casing. The post has a slot 36 in which a cross pin 37 whose ends are anchored to the sleeve may travel and a spring 38 in the post has one end connected to the cross pin 37 and the other end resting on a support at the bottom of the post, the action of the spring being to hold the sleeve 33 in the position in which it is shown in Fig. 7, or to return it to that position during successive cycles of the manually operated parts of the machine. When the sleeve is in the position just described, the shutters are held at or about the tops of the reamers.

The post is provided with an external rack 39 engaged by a pinion 40 on a shaft 41, which shaft is journaled in a housing 42 formed as a part of a sleeve 43 which is slidable on the post 35. The post has a head 44 to which a spring 45 is anchored and the lower end of the spring is connected to a cross pin 46 which moves in the slot 36 when the sleeve 43 is reciprocated, it being understood that the cross pin 46 is anchored to the sleeve 43.

The shaft 41 is provided with a crank handle 47 which, when moved in the direction of the arrow (Fig. 1), causes the sleeve to move downwardly on the post.

A knife 48 is carried by an arm 49 on the sleeve 43 and the knife coacts with fruit-holder 50 for cutting the fruit in half, it being understood that the fruit is delivered to the seat by means of a chute 51 leading to the seat.

The housing 42 has an arm 52 which supports two inverted cups 53 and 54, which cups are moved as the sleeve 43 is reciprocated, and the movement is such that the cups are brought into the zone of action of the reamers and they serve to engage fruit which is supported by the shutters and force said fruit to the reamers. During this operation, the shutters separate and pass over a portion of the reamers, since the movement of the sleeve 43 is such that it engages the sleeve 33 in its descent and moves it downwardly. The fruit skins are, of course, supported by the shutters and when the sleeve 33 is retracted the fruit skins are dislodged from the reamers and are carried up to the position shown in Figure 1, from whence the fruit skins may be removed. Should there be a tendency of the fruit skins to lodge in the cups 53 and 54, ejectors are provided for each cup, the said ejectors each comprising a rod 55 which is slidable in a hollow boss 56 of each cup, it being shown that each rod is under pressure of a spring 57 whose upper end abuts the end wall of the boss and whose lower end engages a plate 58 at the lower end of the rod. When the fruit is pressed into engagement with the reamers, the springs of course are compressed, but on expanding with the return of the parts to normal position, fruit skins which have a tendency to remain in the cups will be dislodged. It will be seen, therefore, that the fruit skins are positively removed from the reamers and are ejected from the cups so that the only manual operation for the removal of the skins is that of taking them from the shutters when said shutters are elevated.

During the operation of the machine, the fruit will be cut into halves and when those halves have been placed on the shutters, another will be in position to be cut, so that during the manual operation of the crank handle the fruit that has been previously placed on the shutters and the one that is occupying the position under the knife will be acted on simultaneously.

It is shown that the inner edges of the shutters are provided with curved flanges 27' which engage the reamers and produce a camming action which tends to force the shutters apart as they descend.

I claim:

1. In a fruit juice extractor, vertically mounted reamers, means for rotating them, a bracket suspended above the reamers, shutters slidable on the bracket, said shutters having oppositely curved inner edges and adapted to support fruit and engage the reamers when moving with relation to the reamers, curved flanges at the inner edges of the shutters forming cams for engaging the reamers, means for forcing the shutters toward each other, a suitably guided reciprocating sleeve on which the bracket is supported, inverted cups suspended above the shutters, means for reciprocating the cups with relation to the reamers and shutters, including means for moving the sleeve, means for returning the cups and means for returning the sleeve to their initial positions.

2. In a fruit juice extractor, vertically mounted reamers, means for rotating the reamers, a standard suitably supported, a sleeve slidable on the standard, a bracket carried thereby and having a horizontally disposed portion normally positioned above the reamers, shutters slidable on the said horizontal portion, the said shutters having oppositely curved inner edges, the shutters at said edges having cam flanges and operative to ride over the surfaces of the reamers and be moved apart thereby while supporting the fruit being reamed, means for exerting force on the shutters to move them together, means for engaging the fruit for pressing it on the reamers, means for simultaneously moving the bracket downwardly, and means for restoring the aforesaid parts to their initial positions.

3. In a fruit juice extractor, vertically mounted reamers, means for rotating them, a standard suitably supported in relation to the reamers, a sleeve slidable on the standard, means for temporarily maintaining the sleeve at a certain elevation and returning it to said elevation after operation, a bracket carried by the sleeve having an angularly disposed portion extending over the reamers, shutters slidable on the angularly disposed portion above the reamers, the said shutters having oppositely curved inner edges, curved flanges at the oppositely curved edges operative to engage the reamers for forcing the shutters apart when said shutters are forced down over the reamers, means tending to force the shutters together when disengaged from the reamers, inverted cup-shaped members suspended above the reamers and adapted to engage fruit supported by the shutters, means for moving the said cup-shaped members downwardly and pressing the fruit into engagement with the reamers, and means for restoring the last mentioned means to their initial positions.

4. In a fruit juice extractor, vertically mounted reamers, means for rotating them, a standard suitably supported in relation to the reamers, a sleeve slidable on the standard, means for temporarily maintaining the sleeve at a certain elevation, a bracket carried by the sleeve having an angularly disposed portion, shutters slidable on the angularly disposed portion above the reamers, the said shutters having oppositely curved inner edges, curved flanges at the oppositely curved edges operative to engage the reamers for forcing the shutters apart, means tending to force the reamers together, inverted cup-shaped members suspended above the reamers and adapted to engage fruit supported by the shutters, means for moving the said cup-shaped members downwardly and pressing the fruit into engagement with the reamers, means for restoring the operating parts to their initial positions, a knife reciprocating simultaneously with the cup-shaped members, and a fruit seat with relation to which the knife operates.

NORVAL M. FAULDS.